(12) United States Patent
Xu

(10) Patent No.: US 10,836,135 B2
(45) Date of Patent: Nov. 17, 2020

(54) THREE-DIMENSIONAL MULTI-REINFORCED COMPOSITES AND METHODS OF MANUFACTURE AND USE THEREOF

(71) Applicant: Florida State University Research Foundation, Inc., Tallahassee, FL (US)

(72) Inventor: Chengying Xu, Tallahassee, FL (US)

(73) Assignee: Florida State University Research Foundation, Inc., Tallashassee, FL (US)

( * ) Notice: Subject to any disclaimer, the term of this patent is extended or adjusted under 35 U.S.C. 154(b) by 1110 days.

(21) Appl. No.: 14/874,818

(22) Filed: Oct. 5, 2015

(65) Prior Publication Data

US 2016/0176156 A1    Jun. 23, 2016

Related U.S. Application Data

(60) Provisional application No. 62/068,239, filed on Oct. 24, 2014.

(51) Int. Cl.
*B32B 5/26* (2006.01)
*B32B 5/02* (2006.01)
(Continued)

(52) U.S. Cl.
CPC .................. *B32B 5/26* (2013.01); *B32B 5/00* (2013.01); *B32B 5/024* (2013.01); *B32B 5/06* (2013.01); *B32B 5/08* (2013.01); *B32B 38/08* (2013.01); *B32B 2260/021* (2013.01); *B32B 2260/023* (2013.01); *B32B 2260/04* (2013.01); *B32B 2260/046* (2013.01); *B32B 2262/106* (2013.01); *B32B 2262/12* (2013.01); *B32B 2307/20* (2013.01); *B32B 2307/202* (2013.01); *B32B 2307/302* (2013.01); *B32B 2307/54* (2013.01); *B32B 2307/546* (2013.01);
(Continued)

(58) Field of Classification Search
USPC .............. 428/293.4, 299.1; 501/32; 205/180; 252/502; 427/255.28, 322
See application file for complete search history.

(56) References Cited

U.S. PATENT DOCUMENTS 7,537,825 B1    5/2009  Wardle et al.
8,148,276 B2    4/2012  Nejhad et al.
(Continued)

OTHER PUBLICATIONS

Veedu, V. P. et al., "Multifunctional Compositions Using Reinforced Laminate With Carbon-Nanotube Forests", Nature Materials 5, (2006), pp. 457-462.
(Continued)

*Primary Examiner* — Lynda Salvatore
(74) *Attorney, Agent, or Firm* — Everdsheds Sutherland (US) LLP

(57) ABSTRACT

Composite materials are provided which may include one or more sheets of carbon fibers woven in orthogonal direction bundles; carbon nanotubes embedded within pores between the bundles; and a matrix material in which the one or more sheets and the carbon nanotubes are embedded. In one case, the carbon fibers lie substantially in an x-direction and a y-direction and the carbon nanotubes are oriented substantially in a z-direction, which is substantially perpendicular to the x- and y-directions. Methods for making the composite materials are also provided.

19 Claims, 12 Drawing Sheets

(51) Int. Cl.
*B32B 5/00* (2006.01)
*B32B 5/08* (2006.01)
*B32B 5/06* (2006.01)
*B32B 38/08* (2006.01)

(52) U.S. Cl.
CPC ..... *B32B 2307/558* (2013.01); *B32B 2309/68* (2013.01); *B32B 2313/04* (2013.01)

(56) References Cited

U.S. PATENT DOCUMENTS

| | | | |
|---|---|---|---|
| 8,664,573 B2* | 3/2014 | Shah | B64D 15/12 219/482 |
| 2005/0181192 A1* | 8/2005 | Steffier | B32B 18/00 428/293.4 |

OTHER PUBLICATIONS

Tehrani, M., et al., "Hybrid Carbon Fiber/Carbon Nanotube Composites for Structural Damping Applications", Nanotechnology 24, (2013), 155704.

Rong, H. P., et al., "Comparison of Chemical Vapor Deposition and Chemical Grafting for Improving the Mechanical Properties of Carbon Fiber/Epoxy Composites With Multi-Wall Carbon Nanotubes", J. Mater. Sci. 48, (2013), pp. 4834-4842.

Hu, J., et al., "Tailoring Carbon Fiber/Carbon Nanotubes Interface to Optimize Mechanical Properties of CF-CNTs/SIC Composites", Int'l J. Applied Ceramic Technology 11(2), (2014), pp. 207-217.

An, F., et al., "Preparation of Vertically Aligned Carbon Nanotube Arrays Grown Onto Carbon Fiber Fabric and Evaluating Its Wettability Effect of Composite", Applied Surface Science 258, (2011), pp. 1069-1076.

Boura, O., et al., "Carbon Nanotube Growth on High Modulus Carbon Fibres: Morphological and Interfacial Characterization", Surf. Interface Anal. 45, (2013), pp. 1372-1381.

Garcia, E. J., et al., "Joining Prepreg Composite Interfaces With Aligned Carbon Nanotubes", Composites: Part A 39, (2008), pp. 1065-1070.

An, L., et al., "Carbon-Nanotube-Reinforced Polymer-Derived Ceramic Composites", Advanced Materials 16(22), (2004), pp. 2036-2040.

Riedel, R., et al., "A silicoboron carbonotride ceramics stable to 2,000C", Nature 382, (1996), pp. 796-798.

Zinmermann, A., et al., "High-temperature deformation of amorphous Si—C—N and Si—B—C—N ceramics derived from polymers", Acta Materialia 50, (2002), pp. 1187-1196.

Christ, M., et al., "High-temperature mechanical properties of Si—B—C—N-precursors-derived amorphous ceramics and the applicability of deformation models developed for metallic glasses," J. Am. Ceram. Soc. 83(12), (2000), pp. 3025-3033.

Shao, G., et al., "Ceramic Nanocomposites Reinforced with a High Volume Fraction of Carbon Nanofibers", Materials Letters 68, (2012), pp. 108-111.

Freese, D., et al., "Polymer-Derived Ceramic Sensors for Temperature Measurement in Harsh Environment", ASMA Turbo Expo 2013, GT2013-96031, Jun. 3-7, San Antonio, Texas.

Liu, J., et al., "Investigation on Micro-End-Milling of Polymer-Derived Ceramics for High Temperature Micro-Sensor Fabrication", NSF CMMI Engineering Research and Innovation Conference, Jan. 4-7, 2011, Atlanta, GA.

Liu, J., et al., "Micro-machinable Polymer-Derived Ceramics Sensors for High-Temperature Applications", ASME Conference on Smart Materials, Adaptive Structures & Intelligent Systems, SPIE Smart Structure/NDE Conference, Sensors and Smart Structures Technologies for Civil, Mechanical, and Aerospace Systems, Mar. 7-11, 2010, San Diego, CA.

Lojewski, B., et al., "Design, Fabrication, and Characterization of Linear Multiplexed Electrospray Atomizers Micro-Machined from Metal and Polymers", Aerosol Science and Technology 47, (2013), pp. 146-152.

Thostenson, E.T., et al., "Carbon Nanotube/Carbon Fiber Hybrid Multiscale Composites", Journal of Applied Physics 91(9), (2002), pp. 6034-6037.

* cited by examiner

⊢─┤ 100 μm

⊢─┤ 100 μm

⊢—⊣ 100 μm

⊢—⊣ 100 μm

THREE-DIMENSIONAL MULTI-REINFORCED COMPOSITES AND METHODS OF MANUFACTURE AND USE THEREOF

CROSS-REFERENCE TO RELATED APPLICATIONS

This application claims priority benefit of U.S. Provisional Application No. 62/068,239, filed Oct. 24, 2014, which is incorporated herein by reference.

STATEMENT REGARDING FEDERALLY SPONSORED RESEARCH OR DEVELOPMENT

This invention was made with government support under grant number N00014-14-1-0543 awarded by the Office of Naval Research. The government has certain rights in the invention.

BACKGROUND

Fiber reinforced composites are desirable for structural applications because it is generally recognized that the inclusion of long fibers (such as carbon fibers) can help prevent catastrophic brittle failure in structural materials (such as ceramic materials) by providing various energy dissipation processes. However, several key limitations impede such composites from being more widely adopted into broader applications. These limitations include their relatively low strength/toughness, especially inter-laminar shear strength and inter-laminar fracture toughness in two-dimensional (2D) woven composites and their lack of thermal/electrical transport functionality.

Interfacial adhesion between fiber and matrix in fiber reinforced composites also has been identified as a significant factor limiting their use in practical structural design and applications. In particular, it is a dominant factor that contributes to composite delamination. In order to further increase the strength and toughness of various structural materials (such as fiber reinforced ceramic matrix composites) as well as to achieve the desired thermal/electric properties, improved reinforcement materials and structures are needed.

Carbon nanotubes (CNTs) have attracted interest as reinforcements due to their unique properties. Recently, different methods have been tried to place vertically aligned or random CNTs on fiber surfaces in order to take advantage of the superior properties of CNTs. Most existing research methods use chemical vapor deposition (CVD) to grow multi-wall carbon nanotubes (MWCNTs) on carbon fiber (Cf). For example, the first modification of a surface of a pitch-based carbon fiber was fabricated by growing CNTs directly on carbon fibers using chemical vapor deposition. The change in length scale of CNTs relative to carbon fibers results in a multi-scale reinforced composite. With the inclusion of CNTs by the CVD method, as compared to the as-received carbon fibers, the interfacial shear strength (IFSS) increases from 65 to 135 MPa (increases about 110%) by single fiber pull-out tests for the micro-droplet composite. However, the drawback of the CVD process is that the strength and structure of Cf may be damaged by the chemical reaction during CNTs preparation process. The damaged Cf, in turn, deteriorates desirable properties of the resulting composite. It also is difficult to control the volume fraction of the CNTs introduced into the composite.

Physical methods such as simple wet impregnation of CNTs on the surface of carbon fiber(s)/fabric(s) is another option used to fabricate multi-scaled reinforced laminate composites having enhanced inter-laminar shear strength and fracture toughness. Another physical method, transfer-printing, has been used to make the CNTs prepreg at room temperature, thereby taking advantage of the tack of the prepreg to separate the CNTs from the growth substrate.

It therefore would be desirable to provide improved methods for reinforcing composites based on CNTs and to provide improved composite structures. It also would be desirable to provide improved methods of making composite materials and structures, which overcome one or more of the limitations described above.

BRIEF SUMMARY

In one aspect, composite materials are provided. In one embodiment, the composite material includes one or more sheets having carbon fibers woven in orthogonal direction bundles, carbon nanotubes embedded within pores between the bundles, and a matrix material in which the one or more sheets and the carbon nanotubes are embedded. In another embodiment, the composite material includes one or more sheets having carbon fibers woven in orthogonal direction bundles, lying substantially in an x-direction and a y-direction, carbon nanotubes embedded within pores between the bundles, oriented substantially in a z-direction, in which the z-direction is substantially perpendicular to the x- and y-directions, and a matrix material in which the one or more sheets and the carbon nanotubes are embedded.

In another aspect, methods for making a composite material are provided. In one embodiment, the method includes providing a multi-reinforcement structure which includes one or more sheets comprising carbon fibers woven in orthogonal direction bundles and carbon nanotubes embedded within pores between the bundles, infiltrating the multi-reinforcement structure with a precursor of a polymer-derived ceramic, curing the precursor to form a pre-ceramic network, and pyrolyzing the pre-ceramic network to form a ceramic matrix in which the multi-reinforcement structure is embedded.

DETAILED DESCRIPTION

Figure 1:
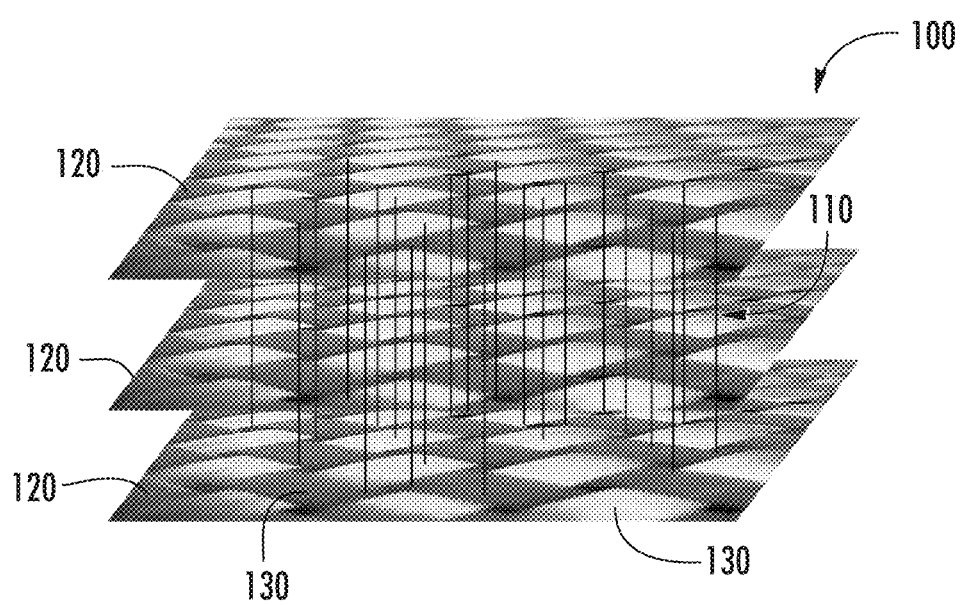
FIG. 1 is a schematic diagram showing the arrangement and orientation of CNTs and Cf components in a multi-reinforced composite structure in accordance with one embodiment of the present invention.

Multi-reinforced composites have been developed which are based on a multi-reinforcement that includes carbon nanotubes (CNTs) integrated within carbon fiber (Cf) sheets. The integration of CNTs was found to enhance the mechanical strength and thermal and electrical properties of the resulting composites as compared to Cf composites without CNTs, particularly where the CNTs are oriented in a direction substantially normal to a plane of a Cf network. This alignment/orientation has been found to ensure the bonding strength along/in the third dimension (i.e., orthogonal to the place of the carbon fibers). Such an alignment is further desirable because of the strong anisotropic properties of the carbon nanotubes.

Methods have been developed to manufacture three-dimensional (3D) multi-reinforced composites, in which the third directional filler (CNTs in this case) is embedded in a substantially vertical direction within each fiber bundle in order to ensure three-dimensional (3D) bonding strength. These methods are advantageously low in cost, compared to conventional processes, and also are readily scalable. These methods may be utilized for a variety of fiber-reinforced material systems, such as polymer, metal, and ceramic. The processes therefore advantageously may be more adaptable than conventional processes, which typically are each limited to specific materials.

Furthermore, the methods described herein provide additional beneficial manufacturing capabilities. For example, these methods have the ability to produce multi-reinforced composites having curvatures or other complex geometries. These methods also have the capability of making composites with high volume fractions of reinforcements (e.g., up to 60 vol. %). The volume fraction of reinforcement can be adjusted, and the reinforcements can be chosen in essentially any scale (i.e., nano-scale, micro-scale or macro-scale) or combination, depending upon the needs of a particular application or design.

The methods described herein also advantageously do not require a chemical reaction that could damage the carbon fibers. The methods are able to allocate the materialization of a three-dimensional (3D) composite without altering the Cf sheets. Therefore, the strength of the carbon fibers of the multi-reinforced composite is maintained.

Multi-Reinforced Composites

Generally, the multi-reinforced composites include a matrix material and a multi-reinforcement that includes or consists of carbon nanotubes and carbon fibers, which typically are carbon fiber sheets. The matrix material may be a metal, a polymer, a ceramic, or a combination thereof. As used herein, "multi-reinforcement" may include a network of multi-reinforcements.

In one embodiment, the composite material include one or more sheets of carbon fibers that are woven in orthogonal direction bundles, carbon nanotubes that are embedded within pores defined by and between the bundles, and a matrix material in which the one or more sheets and the carbon nanotubes are embedded. In a particular embodiment, the matrix material in the composite material is a ceramic material.

In a preferred embodiment, the carbon fiber bundles lie substantially in an x-direction and a y-direction, and the carbon nanotubes are oriented in the z-direction, in which the z-direction is substantially perpendicular to the x- and y-directions. The term "substantially perpendicular" when used to describe the z-direction with respect to the x- and y-directions (x-y plane) means an angle from 85 degrees to 95 degrees therefrom.

FIG. 1 illustrates one example of a multi-reinforcement structure. The structure 100 includes carbon nanotubes 110 and multiple sheets 120 of carbon fiber bundles 130. The carbon nanotubes 110 are aligned along the z-direction and in between each carbon fiber bundle 130. A composite that includes multi-reinforcement structure 100 typically would further include a matrix material (for clarity not shown here) integrated into and/or onto the structure 100.

Carbon fibers and networks of carbon fibers that are suitable for use in the present reinforced composites are known in the art. In one embodiment, the carbon fibers are in form of sheets. In a particular embodiment, the carbon fiber sheets are a polyacrylonitrile plain-woven carbon fabric.

The carbon fibers may be coated with another material. Non-limiting examples of suitable coating materials include pyrolytic carbon (PyC), silicon carbide (SiC), boron nitride (BN), and the like. In a certain embodiments, the carbon fibers are coated with PyC. In one embodiment, the coating has a thickness of about 100 nm. As described in the Examples below, the PyC coating was found, in addition to the CNTs, to also enhance the mechanical properties of the resulting composites.

Carbon nanotubes of the composite that are suitable for use in the present reinforced composites are known in the art. The carbon nanotubes may include single-walled or multi-walled carbon nanotubes, or a combination thereof. Single-walled CNTs may be preferred where relatively higher thermal and/or electrical conductivity is a desirable characteristic of the reinforced composite.

A wide variety of matrix materials known in the art are suitable for use in the present reinforced composites. In one embodiment, the matrix material comprises a ceramic.

In a particular embodiment, the matrix material comprises a polymer-derived ceramic material. Polymer-derived ceramics (PDCs) are a class of materials, synthesized by thermal decomposition of polymeric precursors, instead of by conventionally sintering ceramic powder compacts. The polymeric precursor is in liquid form, and solidified into a polymer phase and then further pyrolyzed into a ceramic phase. In one embodiment, the polymer-derived ceramic material is silicon carbon nitride. In certain embodiments, the silicon carbon nitride is derived from polysilazane. In another embodiment, the polymer-derived ceramic material is silicon oxycarbide (SiOC).

In another embodiment, the matrix material is a polymer, such as a thermoset polymer or a thermoplastic polymer. In another embodiment, the matrix material comprises a metal. Non-limiting examples of suitable metals include copper, aluminum, magnesium, and the like.

The reinforcing carbon nanotubes and carbon fibers may be combined in various ways within the composite structure. In some embodiments, the carbon nanotubes are embedded within each carbon fiber sheet. For example, the carbon nanotubes may be embedded within the pores between the bundles of each carbon fiber sheet. In a further or an alternative embodiment, the carbon nanotubes are in the form of a layer that is interposed between adjacent carbon fiber sheets. In such embodiments, the average thickness of the layer may be from about 5 μm to about 30 μm. The average thickness of the layer will depend, at least in part, on the manufacturing conditions of the composite, e.g., vacuum pressure. In one embodiment, the average thickness of the layer is about 20 μm.

The matrix material and the reinforcing carbon nanotubes and carbon fibers may be combined in various ways within the composite structure. In some embodiments, the matrix material is co-located with the carbon nanotubes in pores between the bundles of the carbon fibers. In a further or an alternative embodiment, the matrix material is co-located with the carbon nanotubes in the form of a layer that is interposed between adjacent carbon fiber sheets.

The amount the reinforcing carbon nanotubes and carbon fibers within the composite structure may vary, depending for example on the particular needs of and/or applications of the composite material. For example, the carbon fibers and carbon nanotubes may be present in a total amount of less than about 60 volume % of the composite material. In one embodiment, the carbon fibers and carbon nanotubes are present in a total amount from about 0.01 volume % to about 60 volume % of the composite material. In one embodiment, the carbon fibers and carbon nanotubes are present in a total amount from about 5 volume % to about 60 volume % of the composite material. In other embodiments, the carbon fibers and carbon nanotubes are present in the composite material in a total amount from about 10 to about 55 volume %, from about 20 to about 60 volume %, from about 25 to about 55 volume %, from about 30 to about 50 volume %, from about 25 to about 40 volume %, or from about 40 to about 60 volume % of the composite material.

In a preferred embodiment, the CNTs are from about 10% to about 20% by volume of the multi-reinforced composite, and the Cfs are from about 30% to about 40% by volume of the multi-reinforced composite.

Methods of Manufacture

Generally, the methods for making the multi-reinforced composites include preparing a multi-reinforcement (of carbon nanotubes and carbon fibers) and then combining that multi-reinforcement with a matrix material.

In one embodiment, the method includes infiltrating a polymer precursor into a multi-reinforcement, curing the precursor to form a pre-ceramic network, and then pyrolyzing the pre-ceramic network into a ceramic matrix, in which the multi-reinforcement is integrated.

The method of preparing a multi-reinforcement, in a preferred embodiment, includes integrating the carbon nanotubes into carbon fiber sheets. In one embodiment, the step of integrating the carbon nanotubes includes dispersing the carbon nanotubes on a surface of each of the carbon fiber sheets and then embedding the carbon nanotubes within the inter-bundle of each carbon fiber sheet. In a preferred embodiment, the carbon nanotubes are dispersed in a non-solvent liquid to form a CNT suspension, which is then placed onto a surface of the carbon fiber sheet such that the liquid carries the CNTs into pores in the Cf sheet. The liquid is then removed to leave the CNTs embedded in the Cf sheet. In various embodiments, gravity and/or a vacuum pump is used to promote carrying of the suspension into pores in the Cf sheet.

In embodiments where the carbon nanotubes are dispersed on the surface of the carbon fiber sheets, uniform dispersion may be achieved without the need to first disperse the carbon nanotubes into a preliminary matrix material, thereby resulting in a low-cost and more simplified manufacturing process compared to conventional processes. In addition, without being bound by a single theory, the performance of the composite materials is believed, in part, to depend on the dispersion of CNTs in the matrix material and interfacial interactions therebetween.

During material preparation, in order to achieve a certain volume fraction for the multi-reinforcement, firstly, the thickness and volume of the final composite are set to a certain value. The volume of the multi-reinforcement can therefore be directly calculated. With known density of the multi-reinforcement, the needed weight of the multi-reinforcement can be calculated and prepared as the starting reagent.

In some embodiments, the step of infiltrating the polymer-derived ceramic material is operated under vacuum conditions. For example, the infiltration may be operated using a vacuum glass bottle and compression mold.

In a further or an alternative embodiment, the step of integrating the carbon nanotubes also includes interposing a layer of carbon nanotubes between adjacent carbon fiber sheets of the reinforcement material. In such embodiments, the average thickness of the layer is about 20 μm.

The present invention may be further understood with reference to the following non-limiting examples.

Example 1

Structure of CNT-Cf Multi-Reinforcement in Composite

A CNT-Cf reinforced composite was made with MWCNTs, Cf sheets, and a ceramic matrix (SiCN). The MWCNTs had outside diameters of less than 8 µm and lengths ranging from 10 µm to 30 µm. The carbon fibers outside diameters of 8 µm and were woven in orthogonal direction bundles, in which each bundle contained 3000 carbon fibers and the pore size between the carbon fiber bundles was 100 µm. The composite was then polished and fractured, and SEM images of the surfaces were obtained.

Figure 2A:
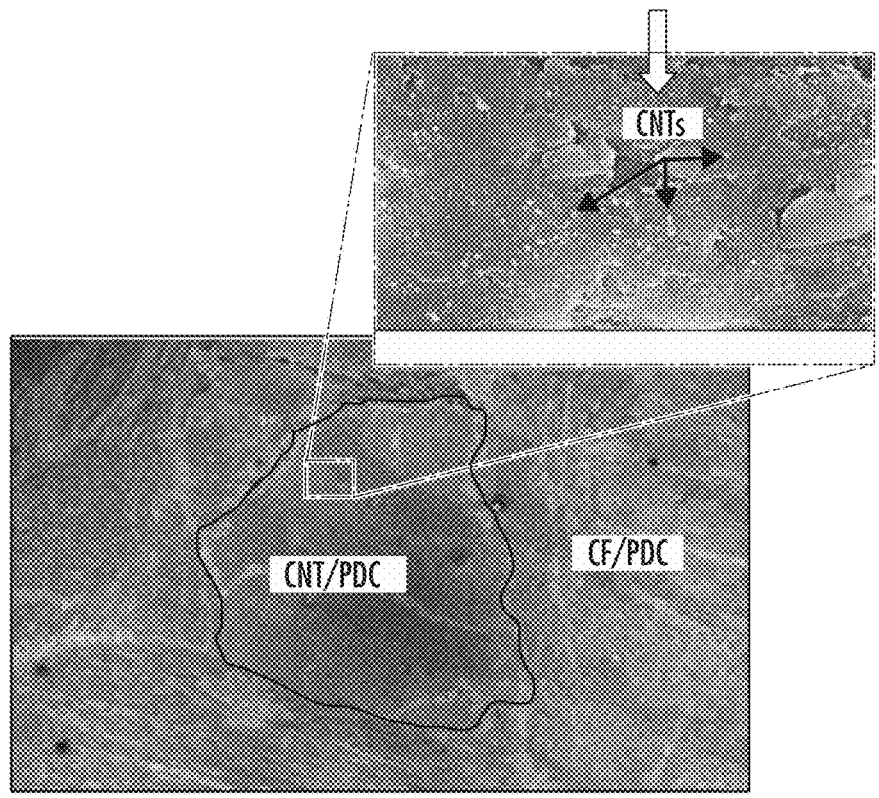
FIGS. 2A-2B are SEM images showing polished and fracture surfaces of a composite material at 100 µm scale and 1 µm scale, respectively, illustrating the through-thickness reinforced CNTs according to an embodiment of the present invention.
Figure 2B:
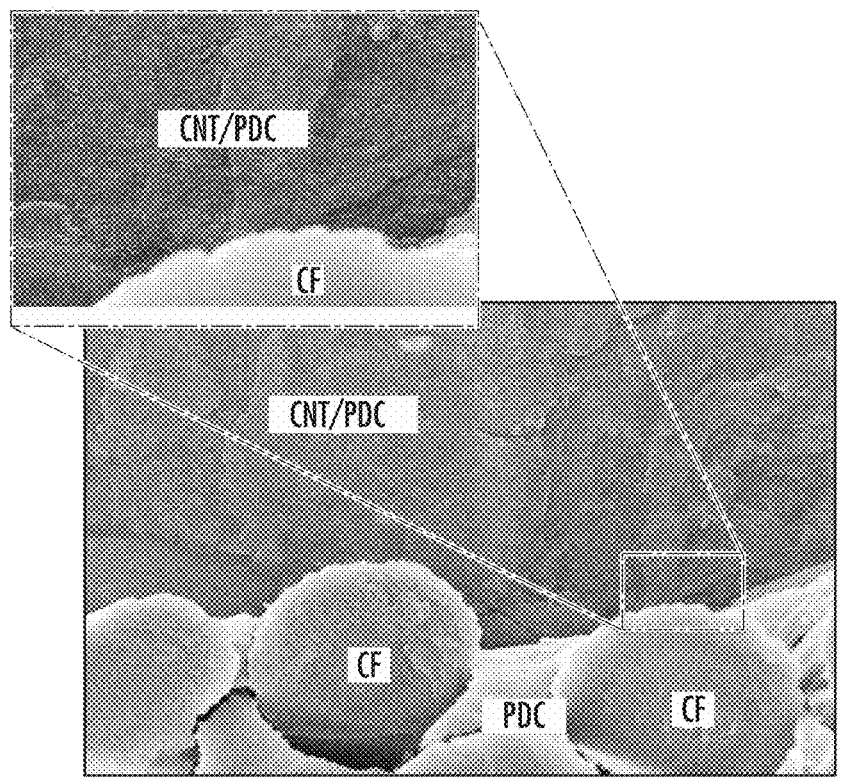

FIG. 2A illustrates a polished surface of the composite along the in-plane direction (top view). FIG. 2B illustrate a fractured cross section surface of the composite along the z-direction. FIGS. 2A-2B show that the carbon nanotubes are vertically aligned along the vertical direction (z-direction).

Example 2

Fabrication of Carbon Fiber (Cf)-Carbon Nanotubes (CNTs) Multi-Reinforcements The carbon fiber (Cf) sheets were high-strength polyacrylonitrile plain-woven carbon fabrics manufactured by Toray Industries. The carbon nanotubes (CNTs) (Timesnano) were chosen as the starting reagents. The CNTs were multi-wall carbon nanotubes (MWCNTs) with outside diameters of less than 8 nm and lengths ranging from 10 µm to 30 µm. The carbon fibers were commercially purchased with adhesion on the surface, which makes around 3000 filaments into a fiber bundle. The average diameter of each carbon fiber filament was 7 µm. Each Cf sheet (thickness of 250 µm) was woven by orthogonal direction bundles (noted as x and y directions) like cloth.

Figure 3:
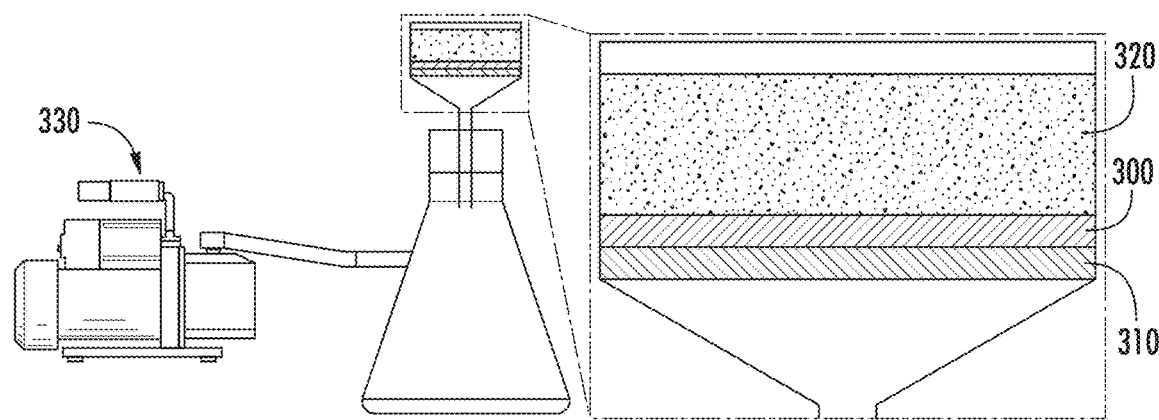
FIG. 3 is a schematic diagram illustrating process equipment that may be used in a preparation of Cf-CNT multi-reinforced composites, in accordance with one embodiment of the present invention.

First, the Cf sheets were heat-treated in a furnace to remove the adhesion on the surface of the Cf sheets. The Cf sheets were then cut into round shapes, each having a diameter of 35 mm, matching the vacuum filtration system requirement. In the last step, as shown in FIG. 3, the Cf sheet or sheets 300 was placed atop filter paper 310 and a CNT suspension 320 was/were filtrated through the carbon fibers of the Cf sheet or sheets 300 under vacuum, via a pump 330, to form Cf-CNTs multi-reinforcements. With respect to the CNTs solution 320, the optimal concentration of CNTs in the water was determined to be 1 mg/ml, and the mass ratio between CNTs and the surfactant was 1:2.

Example 3

Manufacture of Multi-Reinforced Matrix Composites

Figure 4:
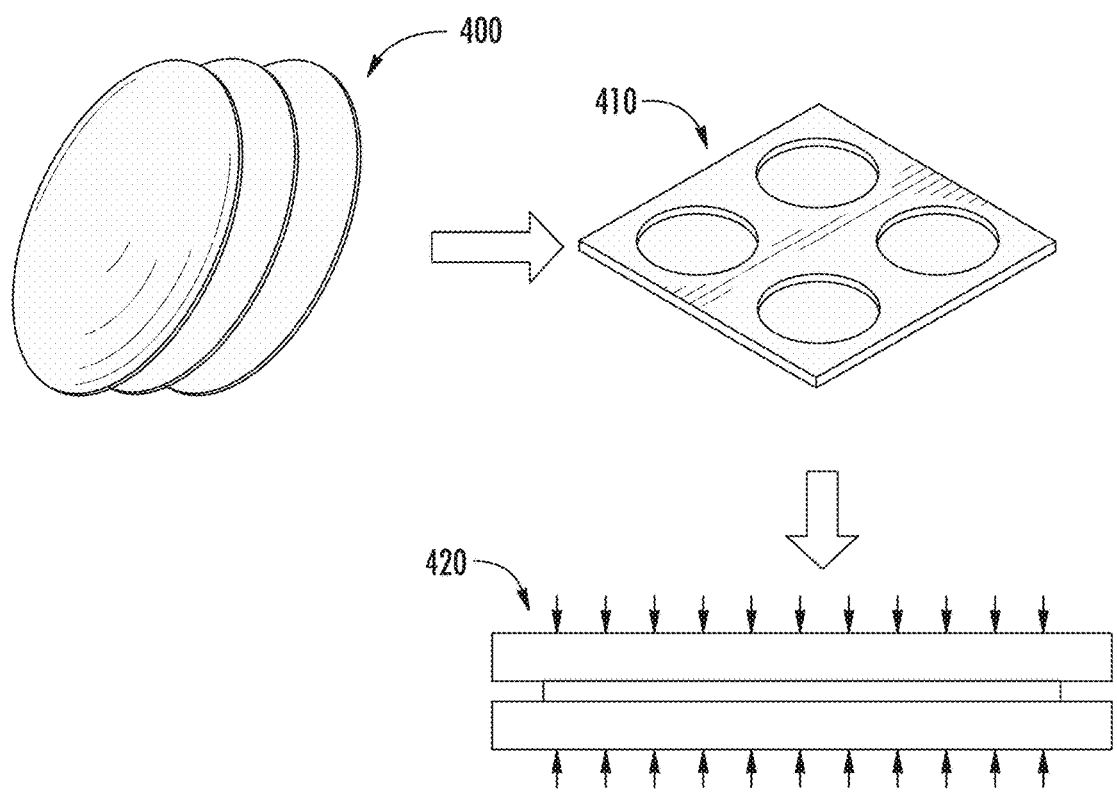
FIG. 4 depicts a process for compression molding to make a composite material in accordance with one embodiment of the present invention.

A precursor of SiCN ceramic, polysilazane, was infiltrated into the Cf-CNTs multi-reinforcements of Example 2 by vacuum condition. The infiltration was operated under the vacuum condition using a pump vacuum glass bottle. Once infiltrated, the precursor was cured into a solid pre-ceramic network by thermal crosslinking within a temperature level of 400-500 K. As shown in FIG. 4, the infiltrated Cf-CNTs multi-reinforcements 400 were placed in a compression mold 410 and pressure (4 ton) was employed via a mold press 420 to control the volume of final composite during the curing process to achieve the desired volume fraction of the final composite sample.

Figure 5:
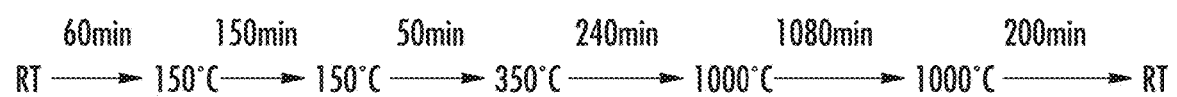
FIG. 5 depicts a temperature profile of a pyrolysis process in accordance with one embodiment of the present invention.

Once cured, the pre-ceramic network underwent a pyrolysis process, in which the network was exposed to elevated temperatures and then decomposed into an amorphous covalent ceramic material. The temperature profile of the pyrolysis process was optimized through experience. The profile/procedure is shown in FIG. 5.

Example 4

Characterization of the Multi-Reinforced Matrix Composites

Two kinds of ceramic composite samples were prepared with the same ceramic matrix (SiCN): the first sample was reinforced with carbon fibers (45 volume %), and the second sample was reinforced with carbon fibers (45 volume %) and carbon nanotubes (10 volume %). The second sample was prepared as described in Example 3, in which the CNTs had a diameter of about 6.6 nm and a length of about 6 µm. The two samples were of the same size, similar density, and similar weight.

A good dispersion of CNTs on the Cf sheet surface was demonstrated as a key factor of the observed fracture behavior. After CNTs were embedded within the inter-bundle of each Cf sheet and also in between each two adjacent Cf sheet, laminate assembly and curing processes were then applied to make the final composites. CNTs on the surface of Cf were confirmed using SEM (see FIG. 6B).

Figure 6A:
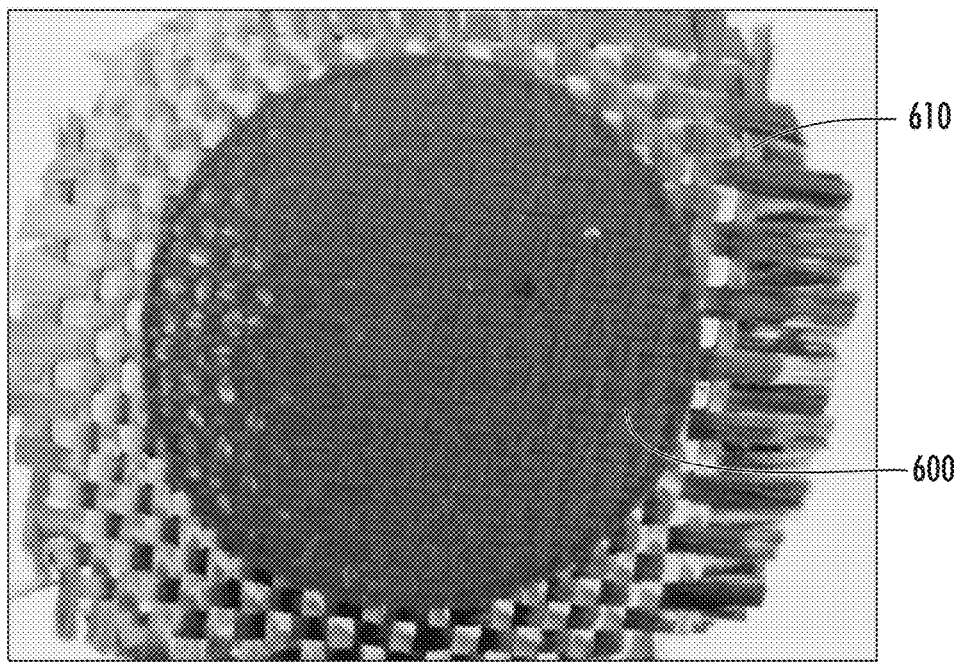
FIGS. 6A-6B are an optical image (FIG. 6A) and a SEM image at 100 µm scale (FIG. 6B) of a Cf-CNT multi-reinforced composite in accordance with one embodiment of the present invention.
Figure 6B:
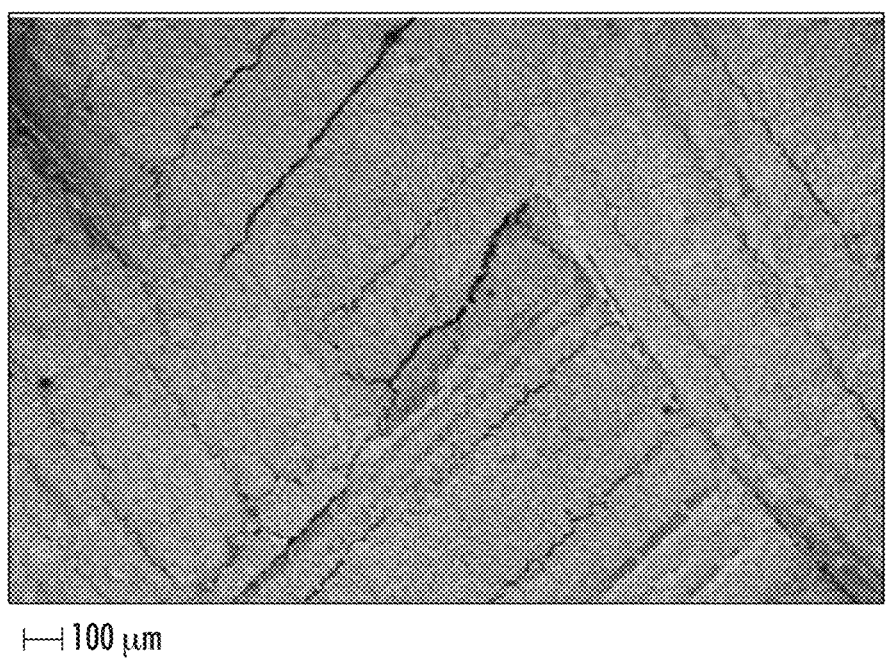
Figure 7A:
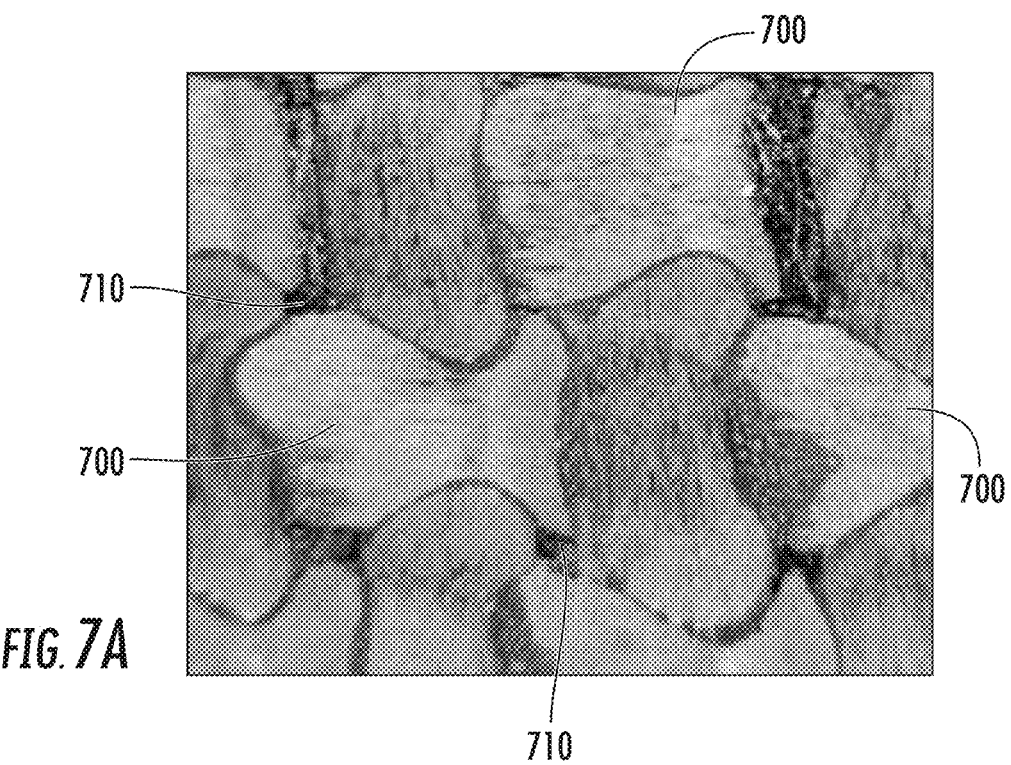
FIGS. 7A-7B are optical images of the polished surface along the in-plane direction (top view) of a Cf-reinforced ceramic composite (FIG. 7A) and a Cf-CNT reinforced ceramic composite (FIG. 7B) in accordance with an embodiment of the present invention.
Figure 7B:
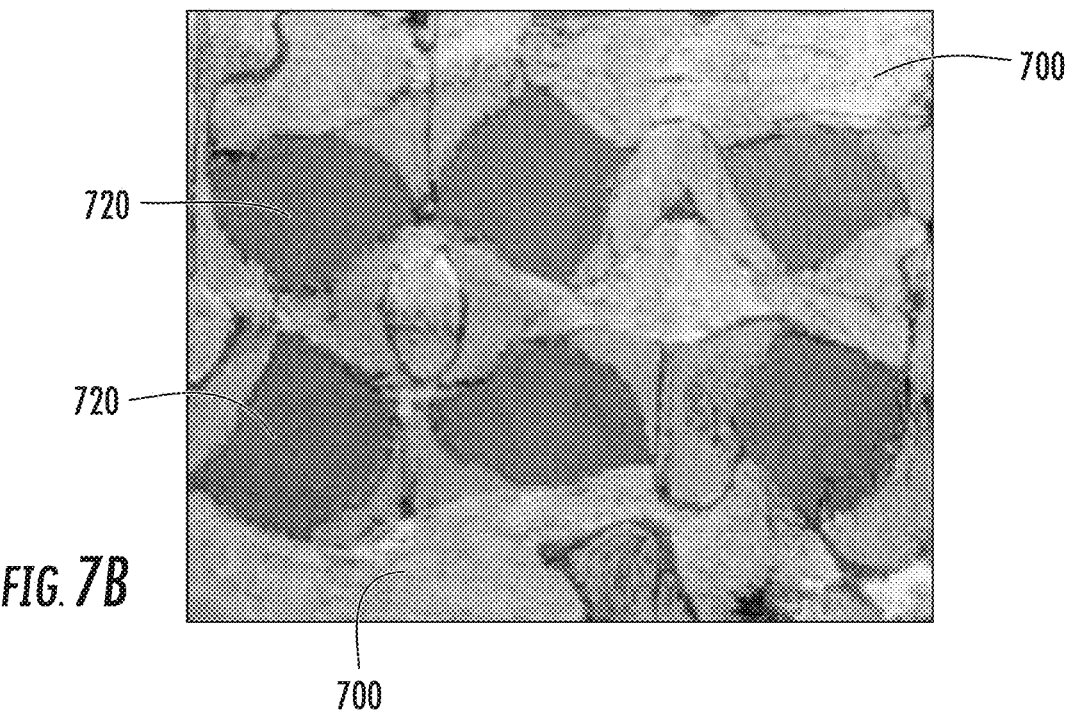

As shown in FIG. 6A, the CNTs 600 can be dispersed easily and substantially uniform on the surface of the carbon fiber bundles 610. Many large pores were observed between the mutual perpendicular carbon fiber bundles 610 (x- and y-directions). After CNTs were dispersed on the surface of the carbon fiber bundles 610, the large pores were filled with CNTs, as shown in FIG. 6B. The optical images depicted in FIGS. 7A-7B further illustrate the fact that the pores 710 that exist between the carbon fiber bundles 700 (FIG. 7A) can be infiltrated with the CNTs 720 (FIG. 7B).

Figure 8A:
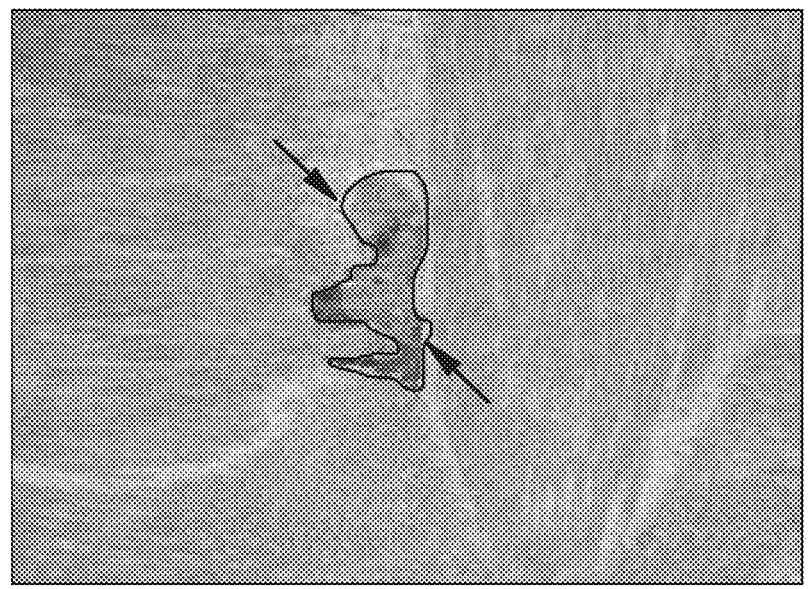
FIGS. 8A-8B are SEM images at 100 μm scale showing polished surfaces along the in-plane direction (top view) of a Cf reinforced ceramic composite (FIG. 8A) and a Cf-CNTs reinforced ceramic composite (FIG. 8B) in accordance with an embodiment of the present invention.
Figure 8B:
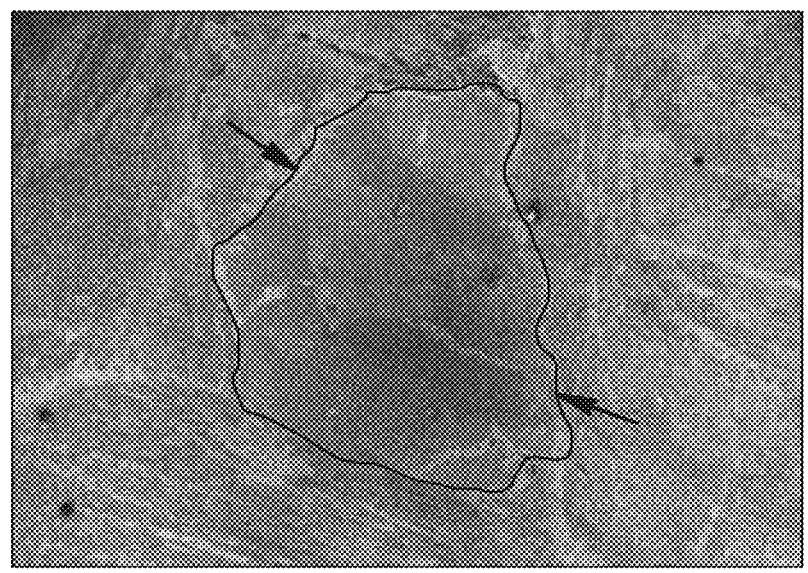
Figure 9A:
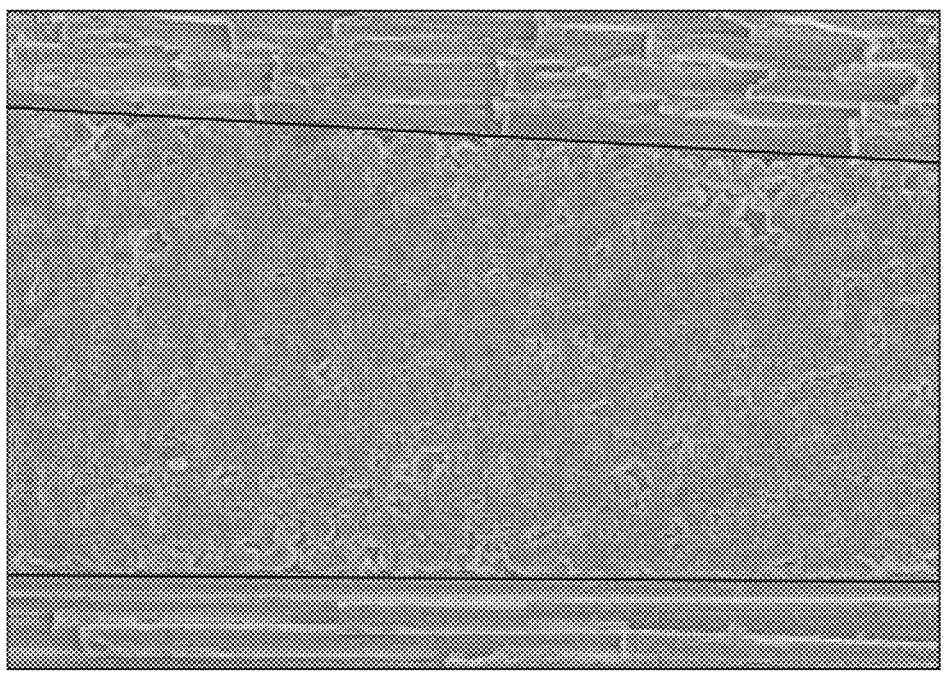
FIGS. 9A-9B are SEM images at 10 μm scale of a cross-section of a Cf reinforced ceramic composite (FIG. 9A) and a cross-section of a Cf-CNT reinforced ceramic composite (FIG. 9B) in accordance with an embodiment of the present invention.
Figure 9B:
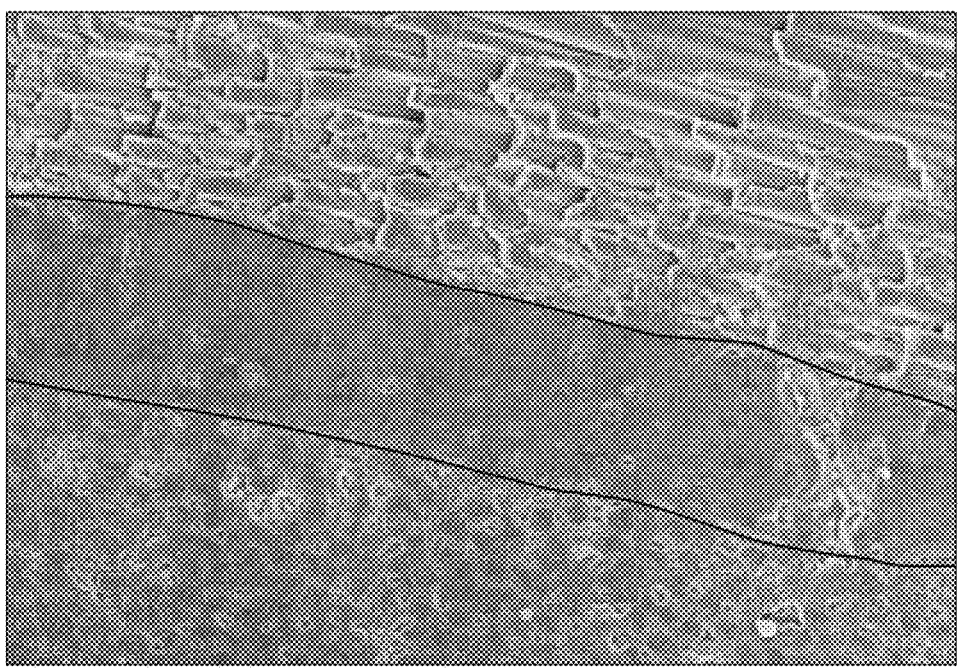

With the inclusion of CNTs into Cf sheets, the macro-sized pores (shown in the black-zoned area, also indicated by arrows, in FIG. 8A) in the inter-bundle in the final composites were infiltrated with CNTs (shown in the black-zoned area, also indicated by arrows, in FIG. 8B), thereby advantageously decreasing in size (e.g., nano-sized pores). This decrease in size, without being limited to a single theory, is believed to improve the densification process. The improved densification and inclusion of CNTs can enhance the mechanical and thermal/electrical properties of the final composites. In addition, as shown in FIGS. 9A-9B, with the inclusion of CNTs (FIG. 9B), there was one interlayer of CNTs between two adjacent carbon fiber layers. The average thickness of the CNTs layer between each two adjacent Cf layers was 20 µm.

The CNTs formed on the fibers were verified using scanning electron microscopy (SEM, Zeiss ULTRA-55 FEG, Carl Zeiss SMT AG Company, Oberkochen, Germany). The microstructures of the final composites were also obtained by SEM from the same facility.

Mechanical Properties

Figure 10:
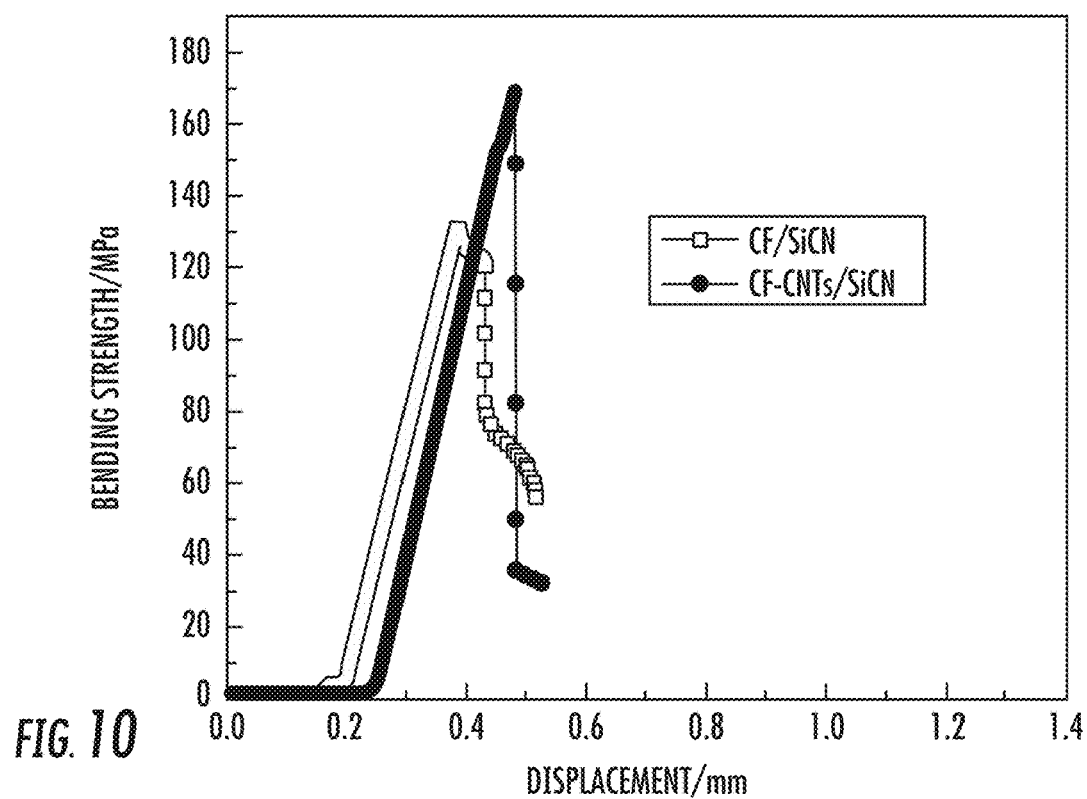
FIG. 10 is a graph comparing bending strengths of a conventional Cf/SiCN composite and a Cf-CNT/SiCN composite in accordance with an embodiment of the present invention.

The bending strength, using a three-point bending strength test, of the samples was measured by a Shimadzu AGS-J instrument. During mechanical testing, the bending strength sample size was about 3 mm*2 mm*20 mm. According to the bending strength test, with the inclusion of CNTs, the strength of the Cf-CNTs reinforced ceramic composite was about 26% higher than that of the Cf reinforced ceramic composite. Thus, as shown in FIG. 10, CNTs can enhance the properties of the resultant ceramic composite.

Thermal Conductivity and Electric Resistivity Properties

Figure 11:
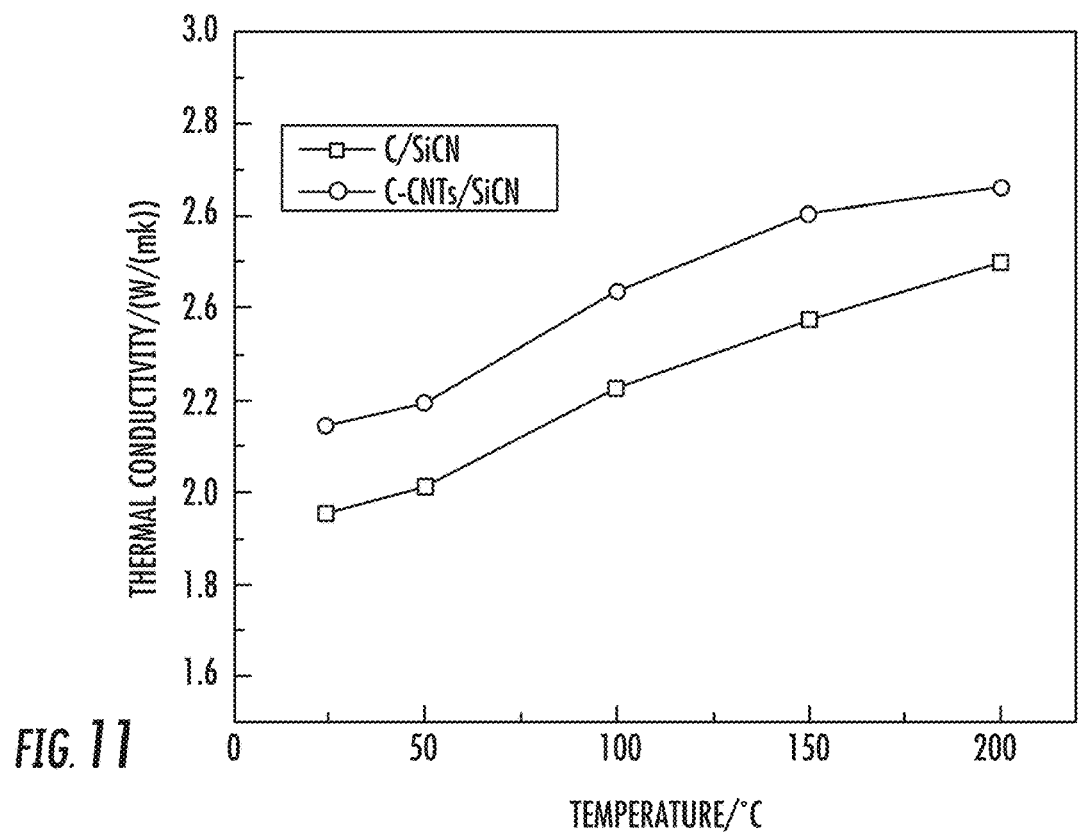
FIG. 11 is a graph comparing the measured thermal conductivities of a Cf/SiCN composite and a Cf-CNT/SiCN composite in accordance with an embodiment of the present invention.

The thermal conductivity of the samples was measured by Netzsch LFA 457 equipment over a temperature range of 100° C. to 900° C. The size of the sample used for thermal conductivity test was 10 mm*10 mm. Thermal conductivity was found to be one of the key properties that were affected by the inclusion of CNTs. As a result of the thermal properties of CNTs, thermal conductivity of the composites was one of the properties that was shown to be improved by CNTs. As shown in FIG. 11, with the help of CNTs, the thermal conductivity (along z axis) was increased by 10%, as compared to the one without CNTs. An increase in thermal conductivity is beneficial in the sense that the higher the thermal conductivity the more quickly heat can dissipate from/through the composite, thereby enhancing cooling, and thus extending the life-time of the composite.

Figure 12:
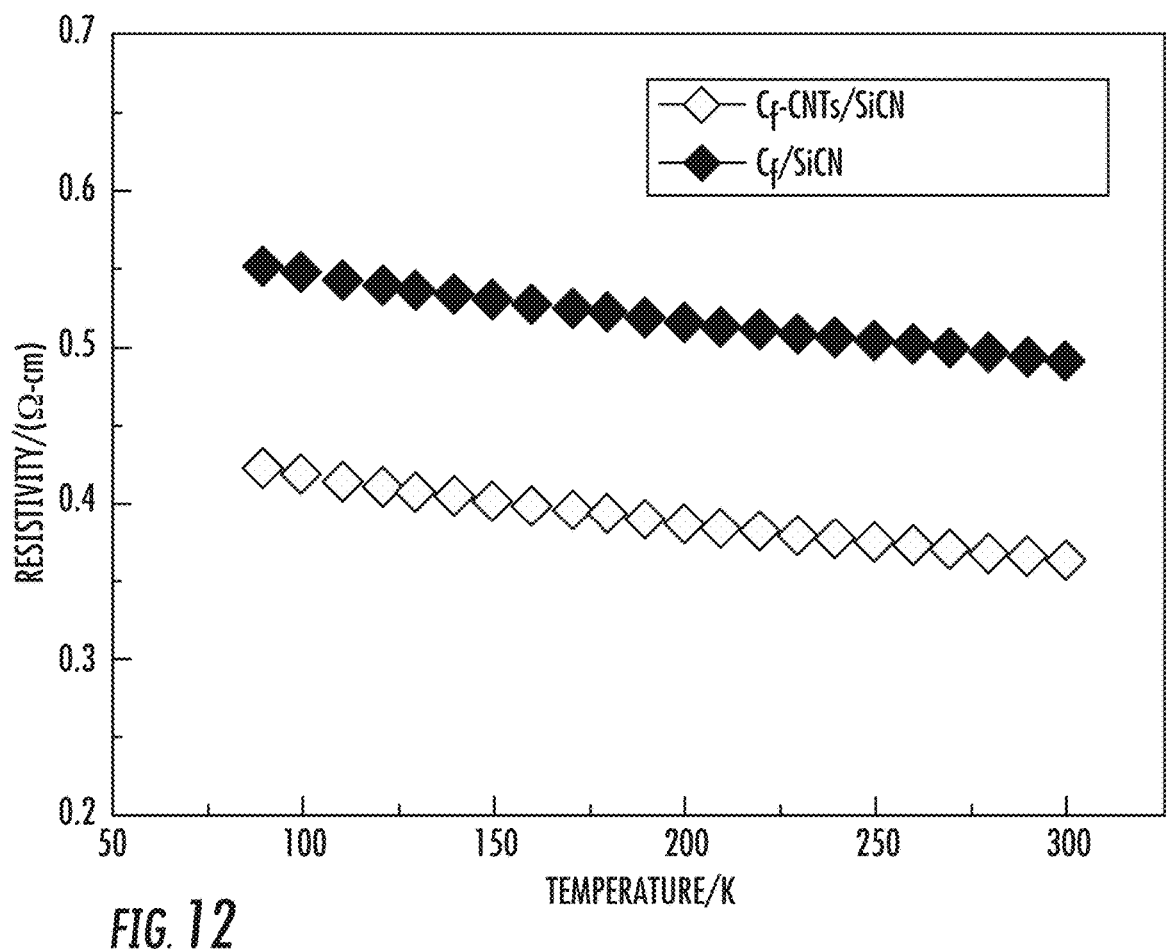
FIG. 12 is a graph comparing the electrical resistivities in the in-plane direction (x- and y-directions) of a Cf/SiCN composite and a Cf-CNT/SiCN composite in accordance with an embodiment of the present invention.

The electrical resistivity along the in-plane direction of the samples was measured over a temperature range from 100-300 K at 10 K intervals using a Janis Research VPF-100 cryostat system. The size of the first sample (i.e., the Cf reinforced composite) used for this electrical resistivity test was about 8 mm×1.7 mm×9.6 mm; the size of the second sample (i.e., the Cf-CNTs reinforced composite) was about 8 mm×1.7 mm×10 mm. As shown in FIG. 12, the electrical resistivity of both samples slowly decreased as the temperature increased. These results further indicated that lower resistivity was achieved with the inclusion of CNTs, as compared to the sample without CNTs—i.e., the electrical conductivity increased by 25%.

Figure 13:
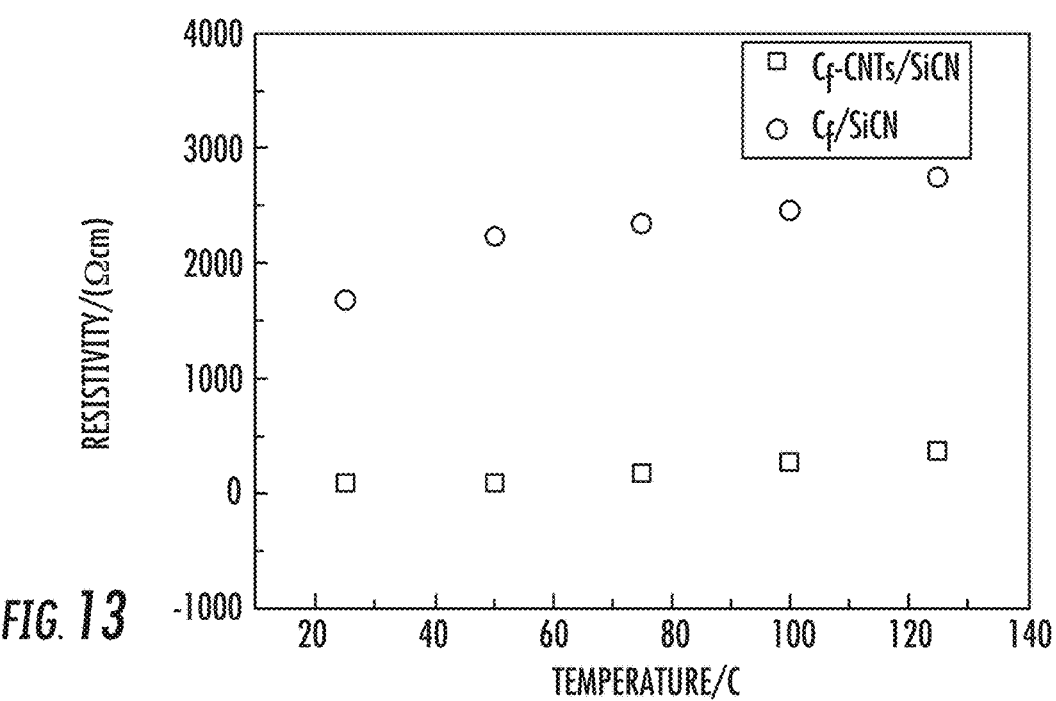
FIG. 13 is graph comparing the electrical resistivities in the through-thickness direction (z-direction) of a Cf/PDC composite and a Cf-CNT/SiCN composite in accordance with an embodiment of the present invention.

In addition, the electrical resistivity along the through-thickness direction of the samples was also tested. This electrical resistivity was measured using a Keithley 2401 source meter, with voltage as the source and current as the measured value. The size of the first sample (i.e., the Cf reinforced composite) used for the electrical resistivity test was about 8 mm×1.7 mm×9.6 mm; the size of the second sample (i.e., the Cf-CNTs reinforced composite) was about 8 mm×1.7 mm×10 mm. The applied voltage sweeping range was set as −8 V to 8 V, with the step of 0.1 V. Each sample was cycled 10 times at each of the following temperatures: 25° C., 50° C., 75° C., 100° C., and 125° C. Data was extracted between −2 V to 2 V to calculate the resistivity of the two samples. As shown in FIG. 13, the resistivity increased with temperature, thereby indicating an Ohmic behavior of the Cf-CNTs/SiCN composite. Furthermore, with the help of CNTs, the electrical resistivity increased 20 times, as compared to the sample without CNTs.

Example 5

Characterization of the Multi-Reinforced Matrix Composites

Two kinds of ceramic composite samples were prepared with the same ceramic matrix (SiCN): the first sample was reinforced with carbon fibers (40 volume %), and the second sample was reinforced with carbon fibers (40 volume %) and carbon nanotubes (10 volume %). The second sample was prepared similar to Example 3, except that the carbon fibers were coated, via chemical vapor deposition, with a pyrolytic carbon, in which the coating had a thickness of about 100 nm. The carbon nanotubes of the second sample had a diameter of about 6-8 nm and a length of about 800-1200 µm. The two samples were of the same size, similar density, and similar weight.

The CNTs formed on the fibers were verified using scanning electron microscopy (SEM, Zeiss ULTRA-55 FEG, Carl Zeiss SMT AG Company, Oberkochen, Germany). The microstructures of the final composites were also obtained by SEM from the same facility. The microstructure of the first sample is shown in FIG. 14 and the microstructure of the second sample is shown FIGS. 15A-15B (the second sample).

Figure 14:
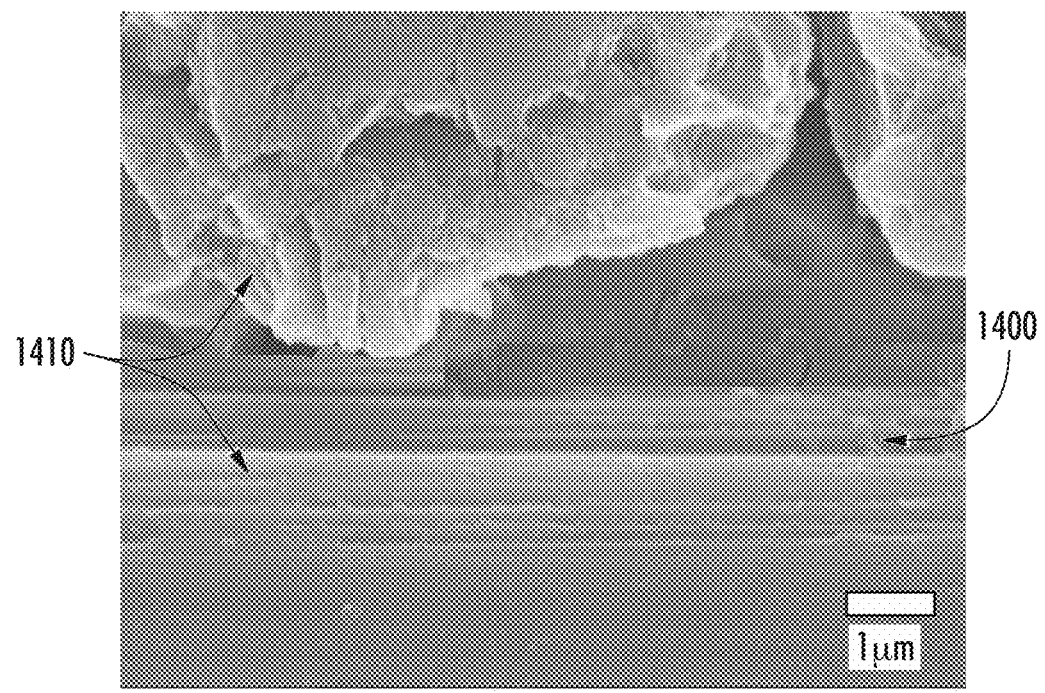
FIG. 14 is an SEM image, at 1 μm scale, of a polished cross-sectional surface of a Cf reinforced ceramic composite in accordance with an embodiment of the present invention.
Figure 15A:
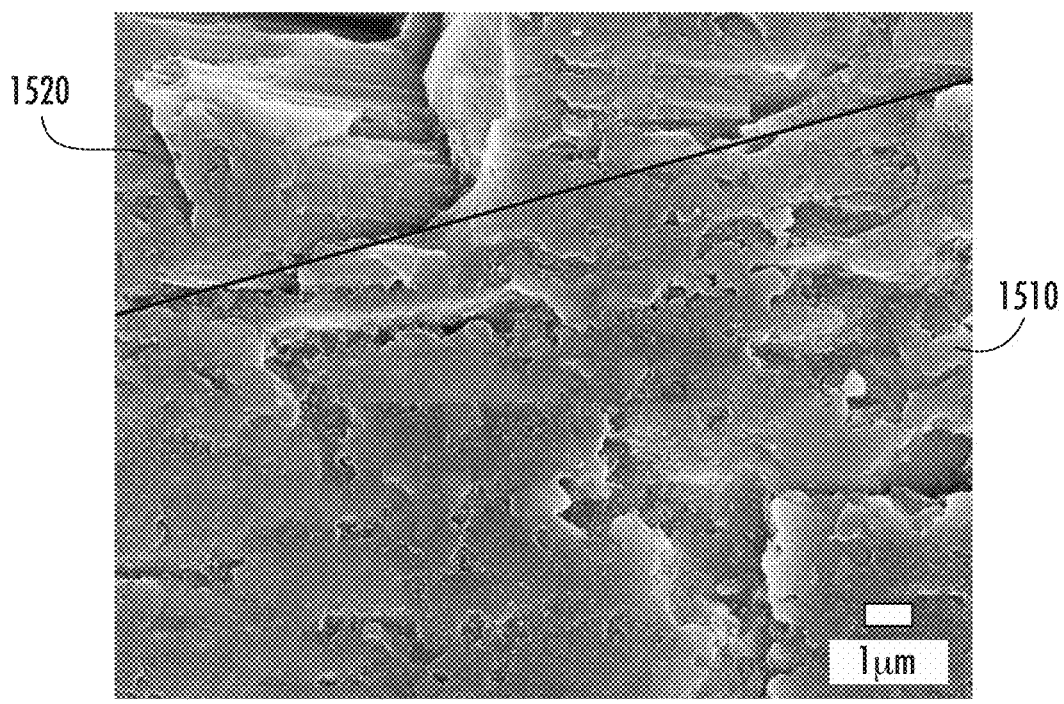
FIGS. 15A-15B are SEM images of a polished cross-sectional surface of a Cf-CNT reinforced ceramic composite at 1 μm scale (FIG. 15A) and at 200 nm scale (FIG. 15B) in accordance with an embodiment of the present invention.
Figure 15B:
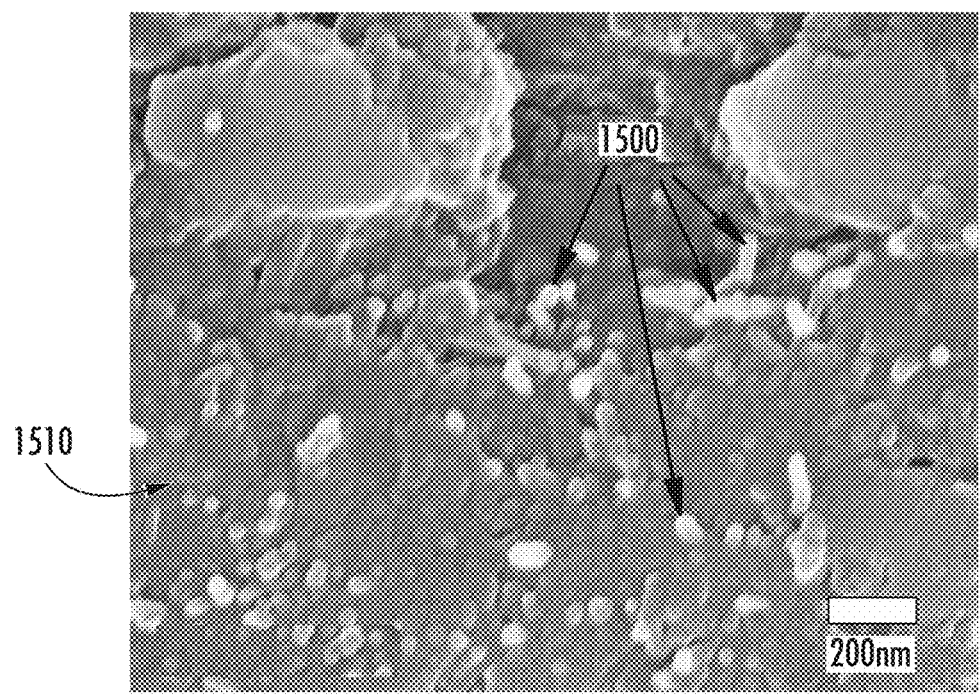

As shown in FIG. 14, without the inclusion of CNTs, interlaminar defects 1400 were found to occur between the carbon fibers 1410, which, without being bound to a single theory, negatively affect the mechanical and thermal/electrical properties of the resulting composite. In contrast, as shown in FIGS. 15A-15B, with the inclusion of CNTs 1500 into the carbon fiber sheet, a CNTs layer 1510, rather than interlaminar defects, existed between the carbon fibers 1520 (in the interlayers of the carbon fiber sheet), thereby enhancing the mechanical and thermal/electrical properties of the resulting composite.

Mechanical Properties

Figure 16:
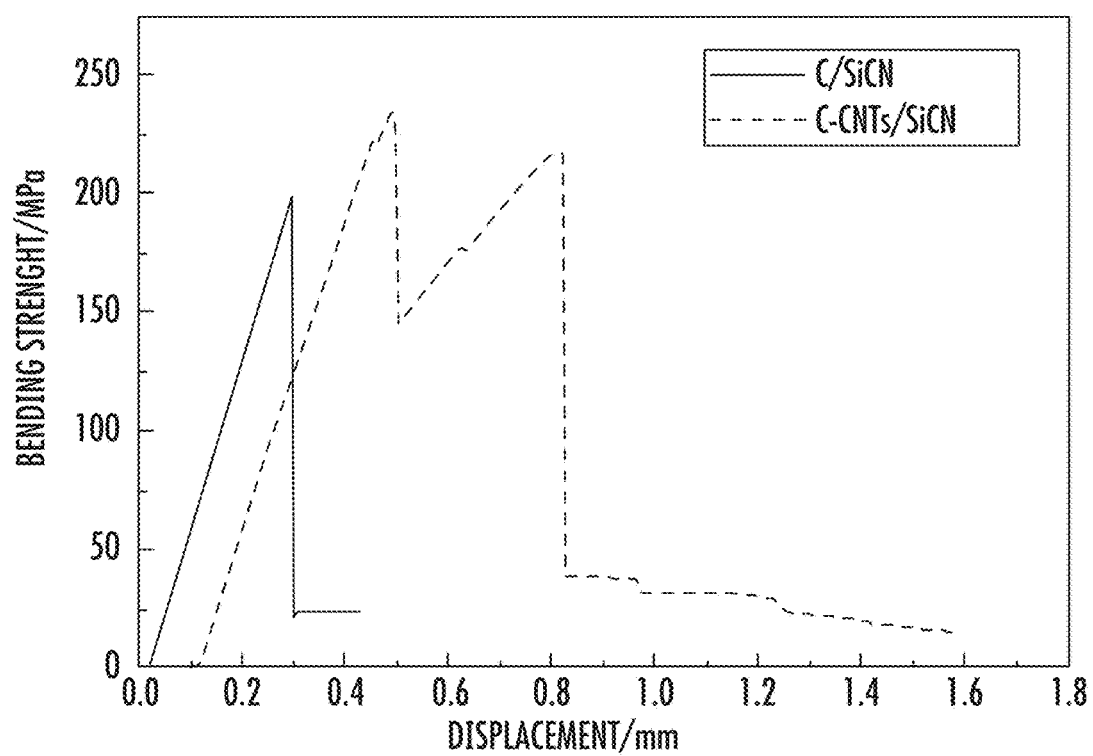
FIG. 16 is a graph comparing bending strengths of a conventional Cf/SiCN composite and a Cf-CNT/SiCN composite in accordance with an embodiment of the present invention.

The bending strength, using a three-point bending strength test, of the samples was measured by a Shimadzu AGS-J instrument. During mechanical testing, the bending strength sample size was about 3 mm*2 mm*20 mm. According to the bending strength test, with the inclusion of CNTs, the strength of the Cf-CNTs reinforced ceramic composite was about 15% higher than that of the Cf reinforced ceramic composite. Thus, as shown in FIG. 16, CNTs can enhance the bending strength properties of the resultant ceramic composite.

Without being bound to a single theory, the increase in strength, as compared to the strength of the samples in Example 4 (see FIG. 10), was believed to be due, in part, to the enhanced bonding between the carbon fibers and matrix material as a result of the pyloric coating. Furthermore, the length of the CNTs was found to have a reciprocal influence on the needling effect between each adjacent Cf sheet. As a result, with the increase in CNT length, the needling effect was increased, thereby improving the strength of the samples, as compared to the samples in Example 4.

Figure 17:
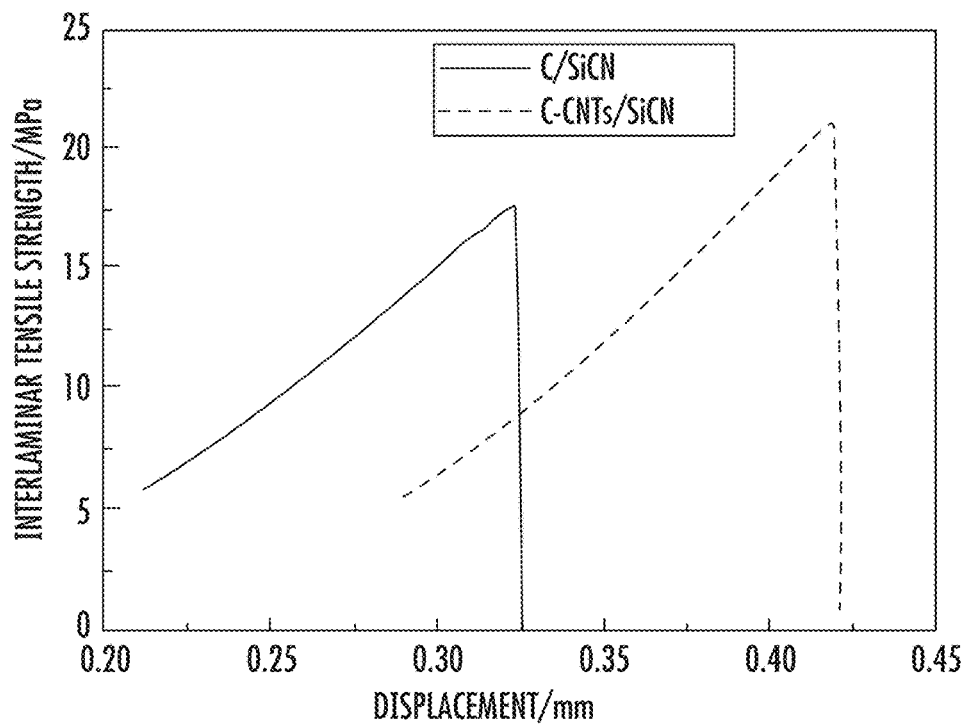
FIG. 17 is a graph comparing interlaminar tensile strengths of a conventional Cf/SiCN composite and a Cf-CNT/SiCN composite in accordance with an embodiment of the present invention.

In addition to the bending strength, the interlaminar tensile strength of the composites was also determined. Interlaminar tensile strength is a key parameter for applications of ceramic carbon fiber composites. With carbon fiber reinforced ceramic composites, there is high risk of delamination parallel to the carbon fiber orientation. This delamination negatively affects the composites ability to support in-plane compressive loads, which can act as insulating planes, thereby increasing the material temperature in the presence of a heat flux and cause further delamination. However, it was found that with the inclusion of CNTs, the interlaminar tensile strength of the composites increased. As shown in FIG. 17, with the help of CNTs, the interlaminar tensile strength (along the z-direction) was increased by 20%, as compared to the composite without CNTs.

Thermal Conductivity

Figure 18:
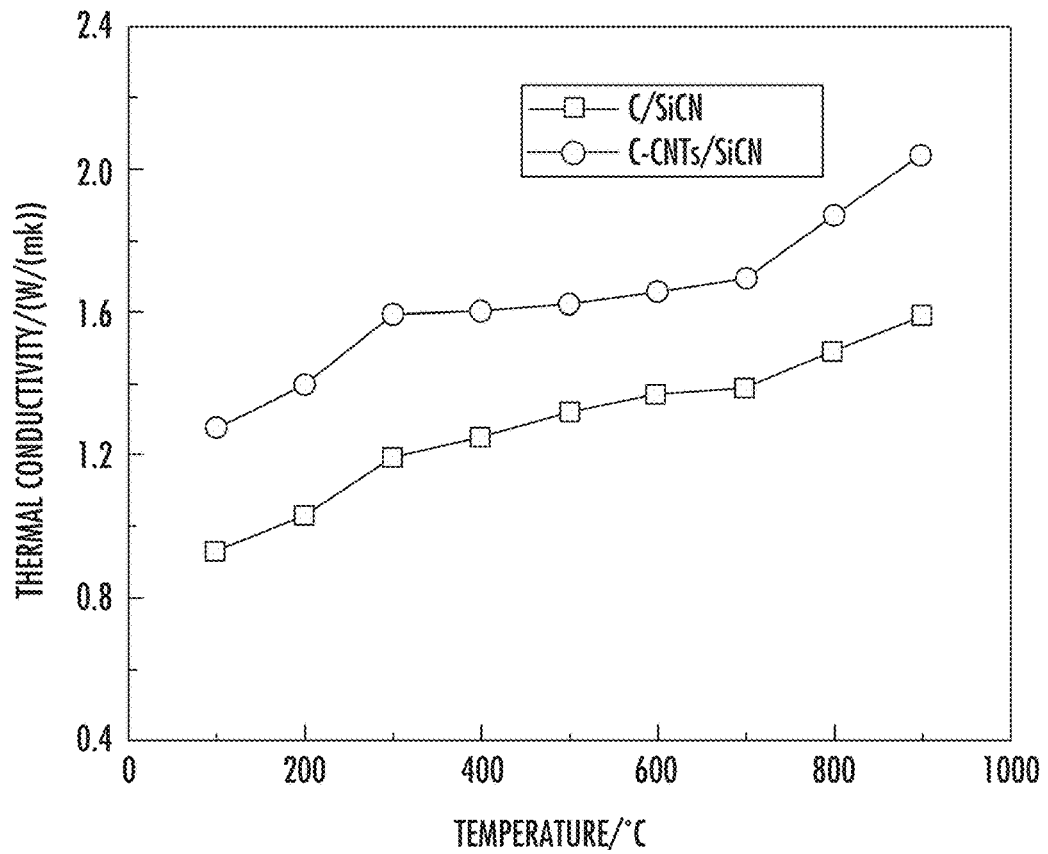
FIG. 18 is a graph comparing the measured thermal conductivities of a Cf/SiCN composite and a Cf-CNT/SiCN composite in accordance with another embodiment of the present invention.

The thermal conductivity of the samples was also measured. The samples were sized about 10 mm*10 mm and measured by Netzsch LFA 457 equipment over a temperature range from 100° C. to 900° C. As shown in FIG. 18, with the inclusion of CNTs, the thermal conductivity (along z-axis) was increased on average by 30%, as compared to the sample without CNTs.

In addition, the thermal conductivity of these samples were found to be higher compared to the samples of Example 4. This increase in thermal conductivity was believed to be attributed to the increase in CNT length, and therefore resulting in an enhanced needling effect between each adjacent Cf sheet.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

I claim:

1. A composite material comprising:
   a sheet consisting of carbon fibers woven in orthogonal direction bundles;
   carbon nanotubes embedded within pores between the bundles substantially oriented in a direction perpendicular to the plane of the sheet; and
   a matrix material in which the sheet and the carbon nanotubes are embedded,
   wherein the pores have a size of 100 µm, which size is decreased by the carbon nanotubes embedded within the pores in an amount effective to improve densification of the composite material as compared to that obtainable without the carbon nanotubes.

2. The composite material of claim 1, wherein the matrix material comprises a ceramic.

3. The composite material of claim 2, wherein the ceramic matrix material comprises a polymer derived ceramic.

4. The composite material of claim 2, wherein the ceramic matrix material comprises silicon carbon nitride.

5. The composite material of claim 1, wherein the carbon nanotubes comprise multi-walled carbon nanotubes.

6. The composite material of claim 1, wherein the matrix material is co-located with the carbon nanotubes in pores between the bundles of the carbon fibers.

7. The composite material of claim 1, wherein the carbon fibers and carbon nanotubes are present in a total amount from 5 volume % to 60 volume % of the composite material.

8. The composite material of claim 1, wherein the carbon fibers are coated with pyrolytic carbon.

9. A composite material comprising:
   two or more sheets consisting of carbon fibers woven in orthogonal direction bundles, lying substantially in an x-direction and a y-direction;
   carbon nanotubes embedded within pores between the bundles, oriented substantially in a z-direction, which is substantially perpendicular to the x- and y-directions wherein the carbon nanotubes are dispersed between adjacent ones of the two or more sheets; and
   a matrix material in which the two or more sheets and the carbon nanotubes are embedded,
   wherein the pores have a size which is decreased by the carbon nanotubes embedded within the pores in an amount effective to improve densification of the composite material as compared to that obtainable without the carbon nanotubes.

10. The composite material of claim 9, wherein the matrix material is a ceramic material.

11. The composite material of claim 9, wherein the carbon nanotubes comprise multi-walled carbon nanotubes.

12. The composite material of claim 9, wherein the matrix material is co-located with the carbon nanotubes in pores between the bundles of the carbon fibers.

13. The composite material of claim 9, wherein the carbon fibers and carbon nanotubes are present in a total amount from 5 volume % to 60 volume % of the composite material.

14. The composite material of claim 9, wherein the carbon fibers are coated with pyrolytic carbon.

15. The composite material of claim 9, wherein the composite material has a thermal conductivity along the z-axis which is at least about 10% higher than the thermal conductivity along the z-axis of a comparable composite without carbon nanotubes.

16. A composite material comprising:
   a woven sheet which consists of carbon fiber bundles woven in orthogonal direction bundles defining inter-bundle pores between the bundles;
   carbon nanotubes embedded and oriented orthogonally to the woven sheet within the inter-bundle pores by vacuum filtration; and
   a ceramic matrix material in which the woven sheet and the carbon nanotubes are embedded.

17. The composite material of claim 9, wherein the carbon nanotubes are in the form of a layer that is interposed between ones of the two or more sheets.

18. The composite material of claim 9, wherein the pore size is 100 µm.

19. The composite material of claim 16, wherein the pores have a size of 100 µm, which size is decreased by the carbon nanotubes embedded within the pores in an amount effective to improve densification of the composite material as compared to that obtainable without the carbon nanotubes.

* * * * *